United States Patent [19]

Kano et al.

[11] 3,990,029

[45] Nov. 2, 1976

[54] INSULATED WINDINGS PROVIDED WITH A MOULD RELEASING MATERIAL

[75] Inventors: Ikushi Kano; Takeshi Hakamada; Misao Soma; Mituo Kashimura, all of Hitachi, Japan

[73] Assignee: Hitachi, Ltd., Japan

[22] Filed: May 23, 1975

[21] Appl. No.: 580,368

[30] Foreign Application Priority Data
May 29, 1974 Japan.................. 49-59735

[52] U.S. Cl. ........................... 335/297; 335/299
[51] Int. Cl.² ............................................. H01F 3/00
[58] Field of Search .......... 335/281, 282, 297, 299; 336/96

[56] References Cited
UNITED STATES PATENTS

| | | | |
|---|---|---|---|
| 2,912,627 | 11/1959 | Road.................................. | 335/297 |
| 2,940,019 | 6/1960 | Steinhauser........................ | 335/299 |
| 3,870,982 | 3/1975 | Shibano et al...................... | 335/297 |

*Primary Examiner*—George Harris
*Attorney, Agent, or Firm*—Craig & Antonelli

[57] ABSTRACT

An electromagnetic apparatus in which a semiconductive liner of which at least one side is processed by mold releasing material is provided between the winding embedded in the slots of an iron core and the wall of the slot, and the remainder of the slots is filled with adhesive. The liner employed prevents the winding from adhering to the wall of the slot with the result that the insulating layer of winding is not damaged during thermal cycling and also corona discharge is prevented.

4 Claims, 3 Drawing Figures

INSULATED WINDINGS PROVIDED WITH A MOULD RELEASING MATERIAL

This invention relates to an electromagnetic apparatus comprising insulated windings embedded in slots provided in an iron cone, for example, apparatus such as rotating electrical machines, rectilinear electrical motors, etc.

In the present day process of fabricating windings of electromagnetic apparatus, for example, rotating electrical machines, a prevalent method is the one in which the windings are each formed by insulating collectively a plurality of component conductors and embedding the conductors in the slots of the iron core, after which gaps in the slots are filled with adhesive such as solventless resin. This is the so-called iron core-winding integral impregnation method. By this impregnation method, the insulating layers of the windings are effectively impregnated with resin, and further the insulation performance and the cooling effect of the apparatus are improved because the windings and the iron core are united by means of adhesive into an integral form.

However, this total impregnation method is only effective up to the medium sized electromagnetic apparatus whose iron core thickness is one the order of 1000 mm. When it is applied to an electromagnetic apparatus larger than medium size it will involve a serious problem.

Such a problem arises from the fact that the winding and the iron core are united by means of adhesive into an integral form, although this fact is one of the advantages of the total impregnation method. Generally, in a rotating electrical machine, the winding, more precisely the component conductors constituting the winding, are subjected to a thermal cycling due to the repetition of starts and stops. With the recent development of excellent insulating materials the heat-resistivity of insulating materials is further increased from B class to F class. For this, the temperature difference during thermal cycling is relatively large, so that the expansion difference between the component conductor and the iron core due to the difference of thermal expansion rate therebetween is large. When the iron core and the windings are tightly coupled with adhesive according to the total impregnation method, the adhesion restricts the thermal expansion of the component conductors with the result that the windings are twisted, and thus a shearing force acts on the insulating layers and the windings. This shearing force acting on the insulating layers of the windings becomes maximum at the end of the lamination of iron core. At present, the total impregnation method is applied to only those electromagnetic aparatus having an iron core lamination of relatively small thickness. Therefore, such shearing force provides no problem since the shearing strength of the insulating layer is larger than the shearing force due to thermal expansion. On the other hand, in the case of a lamination core with 1000 mm thickness or more, the difference in thermal expansion between the component conductors and the iron core produced by thermal cycling becomes relatively large. As a result, the shearing force due to thermal expansion is larger than the shearing strength of the insulating layer. This causes a crack in the insulating layer of the windings disposed near the end of the lamination of core, thereby to cause dielectric breakdown.

The simplest solution for such problem is to reinforce the shearing strength of the insulating layers to be larger than the shearing force resulting from the thermal expansion. However, the experiment conducted by the inventor showed that any combination of insulating materials now known fails to provide an insulating material capable of standing the thermal stress (shearing force) owing to the thermal cycling.

There has been another method for assembling the windings into the iron core in which a fluorine-contained polymer film of insulating material, which is hardly adhered to the impregnated resin, is wound around the outermost insulating layer of each winding for purpose of preventing the occurrence of cracking in the winding insulating layer. The thus constructed windings are assembled into the slots provided with a liner of the same fluorine-contained polymer, and finally the windings embedded in the slots are impregnated with resin. According to this method, if there exists a difference of the thermal expansion between the component conductor and the iron core arising from thermal cycling due to the repeated start and stop of the machine, the adhesive of impregnated resin between the fluorine-contained polymer lying on the outermost insulating layer of the winding and the liner is easily broken and these are slidable at the broken portion, with the result that no shearing force acts on the insulating layer of the winding and damage of the insulating layer of the winding is eliminated. This method is useful for the windings of dc electrical machines. However, in the case of high voltage ac electrical machines which may be subjected to corona discharge, the fluorine-contained resin is liable to be volatilized with deterioration due to corona discharge. This problem prevents the method from being applicable to high voltage ac motors.

Incidentally, the liner has been inserted for protecting the insulating layer of winding from being damaged when the winding is fitted into the slot and for providing a corona shield layer between the winding and the slot for restricting corona discharge.

Since the liner of fluorine-contained resin has poor adhesion to other resins and a mold releasing function, it is difficult to coat the liner of fluorine-contained resin with vanish for corona shielding. For this reason, it can protect the insulating layer from being damaged when the windings are assembled into the iron core, but it is ineffective in restricting corona discharge.

An object of the present invention is to provide an electromagnetic apparatus in which there is little deterioration of the insulating layers of the windings due to thermal cycling, and in which corona discharge restriction is possible, even if the iron core-winding total impregnation method is employed.

According to this invention, there is provided an electromagnetic apparatus comprising an iron core made from a number of steel laminations and having a plurality of slots at the surface thereof for accommodating windings, insulating windings each embedded in the slots of the iron core, semi-conductive liners each being disposed between the insulating winding and the wall of corresponding slots and of which at least one side is processed by a mould releasing material, and adhesive filling the slots.

By such a construction, the thermal stress impressed onto the insulating layers of windings is reduced by causing the liner to slide relative to the iron core, and the corona discharge is prevented. Such thermal stress may, otherwise, be great when substantial difference in thermal expansion between the component conductor and the iron core is produced by the thermal cycling due to the repeated start and stop of the machine.

The above and other objects, features and advantages will be apparent from the detailed description taken in conjunction with the accompanying drawings, in which.

Figure 1:
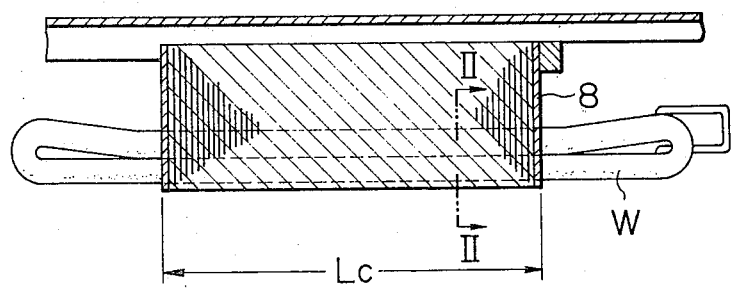
FIG. 1 is a cross sectional view illustrating a part of stator of the electrical motor which is an electromagnetic apparatus according to this invention.
Figure 2:
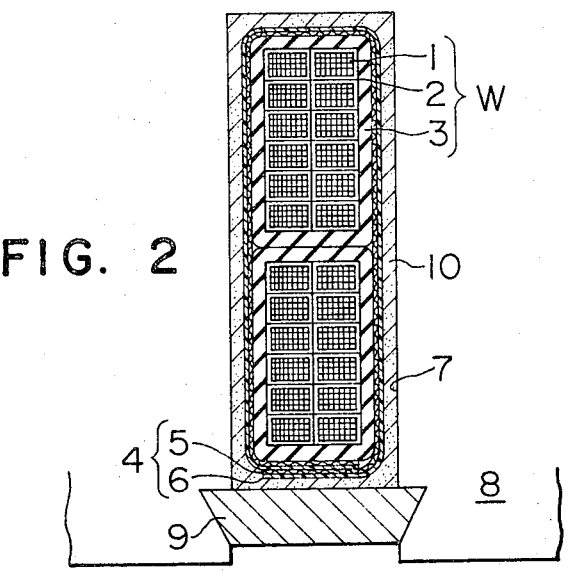
FIG. 2 is a cross sectional view taken on line II — II of FIG. 1.

This invention will be described with reference to FIGS. 1 and 2. As shown in FIG. 2, a winding W is comprised of a plurality of conductors 1 each having a predetermined shape and being covered with an insulator 2 for the component conductor and a ground insulating layer 3 made of insulating tape winding disposed around the conductors 1.

An iron core 8 with a predetermined thickness Lc is made from laminating of silicon steel sheets. The iron core 8 is provided with a plurality of slots 7 in the direction of lamination of sheets, each of which accommodates the winding W. A liner 4 is disposed in the slot 7, along which the winding W is guided into the slot 7 for its accommodation therein. A wedge 9 serves to prevent the winding W embedded in the slot 7 from dropping therefrom.

Adhesive 10, for example, solventless epoxy resin, is impregnated, under reduced pressure, into the winding W thus assembled into the iron core 8. The result is that this adhesive 10 permeates through the insulator 2 and the ground insulating layer 3 of the winding W into the gap between the winding W and the inner surface of the slot 7. Following this, the thus assembled iron core 8 is heated for hardening the adhesive 10.

The manufacturing process as abovementioned seems very similar to the prior insulating treatment of the windings. However, it should be noted that the liner 4 utilizes a semiconductive material, in order to prevent corona discharge, which is made of a polyamide paper 5 coated thereon with polyamidimide resin including carbon powders thereby obtaining $10^3 - 10^5$ ($\Omega$) of surface resistivity. On either side of the polyamide paper 5 coated with the semi-conductive material is further coated with a mould releasing resin 6 of 30 g/m², such as a silicone mould releasing agent. The liner with such construction is so disposed that the layer of the mould releasing resin coating faces the inner surface of the slot 7.

The accommodation of windings in this way, results in distinctive advantages. first, the liner 4 has the function of preventing corona discharge occurrence. second, an excessive thermal stress is prevented from being impressed onto the ground insulating layer 3, even if there exists a difference of thermal expansion between the conductor 1 and the iron core 8 due to the thermal cycling which might occur during repetitive start and stop of the electric machine, because the adhesion between the liner 4 and the iron core 8 is smaller than that between the liner 4 and the winding W due to employment of the mould releasing resin, although the adhesive 10 permeates through the winding W and the iron core 8 to form an integration thereof. More precisely, the thermal stress, which otherwise may be excessively impressed onto the ground insulating layer 3, causes the adhesive between the liner 4 and the iron core 8 to be broken and thereby the liner 4 slides relative to the iron core 4 at the broken portion of the adhesion because of the fact that the adhesion between the liner 4 and the iron core 8 is smaller than the thermal stress.

The following experiment was conducted for purpose of verifying the above-described fact.

A first experiment by using a small type model was conducted for comparing the adhesion between the winding W and the iron core in the axial direction of the invention with that of the prior art.

A first example of the prior art uses a method in which the winding and the iron core are adhered directly to each other with adhesive into an integral form.

In a second example of the prior art, a liner is additionally provided between the winding and the iron core which are of the same construction as those of the first example, and a film layer is laid on the insulating outermost layer of the winding, and the material used for the liner and the film layer is fluorine-contained polymer of film.

A first example of this invention is the same as the embodiment as mentioned hereinbefore.

A second example of this invention is the one in which both the sides of the liner of the first example are coated with silicon mould releasing agent of 30 g/m², respectively.

Table 1

| Example | Shearing strength of adhesion | Shearing surface |
|---|---|---|
| Example 1 of prior art | >18 kg/cm² | — |
| Example 2 of prior art | 6.0 kg/cm² | Between liner and winding |
| Example 1 of this invention | 7.5 kg/cm² | Between liner and winding |
| Example 2 of this invention | 7.0 kg/cm² | Between liner and winding |

As seen from Table 1 showing the result of experiment, it was impossible to pull out the winding from the iron core, in the case of the prior art example 1. That is, it will be understood that an excessive thermal stress must have been impressed onto the ground insulating layer during the thermal cycling due to the repetition of start and stop of the electric machine.

With respect to the example 1 of prior art, and the examples 1 and 2 of this invention, the adhesions of these examples were all below ½ of the shearing force 15 kg/cm² of the ground insulating layer when it was subjected to the heat at 200° C for 40 days. As a result, it was found that the shearing damage of the ground insulating layer was not derived from the thermal stress owing to the thermal cycling, because the adhesive between the liner and the iron core and the adhesive between the liner and the ground insulating layer were both broken to permit them to move slidably to each other at the broken adhesive surface.

A second experiment was conducted for investigating how the electric characteristic of the ground insulating layer is effected when the windings with the constructions shown in the respective examples mentioned above are actually subjected to the thermal cycling. In this experiment, an iron core of 1500 mm thickness corresponding to the actual electric machine in size was used as a model and subjected to the thermal cycling of 1000 times. Table 2 below shows the variation of breakdown voltage due to thermal deterioration resulting from the above treatment.

Table 2

| Example | Reduction rate of breakdown voltage |
|---|---|
| Example 1 of prior art | 63 % |
| Example 2 of prior art | 25 % |
| Example 1 of this invention | 24 % |
| Example 2 of this invention | 28 % |

As shown in the table, the reduction rate of breakdown voltage was small in example 2 of prior art and examples 1 and 2 of this invention, while it was large in example 1 of prior art, i.e. two times or more of the other examples.

When disassembling the windings after the experiment was completed, some abrasion was observed on the surface of the ground insulating layer due to the expansion of the winding caused by the thermal cycling, in the example 2 of prior art and the example 2 of this invention. This abrasion must have been caused by the sliding between the winding and the liner. It is thus expected that the ground insulating layer will be further worn in practical electric machines, since the number of the thermal cyclings further increases. On the other hand, in the example of this invention, there was observed, as a matter of course, no abrasion on the ground insulating layer, although some abrasion was found on the surface of the liner facing the iron core since the liner moved relative to the iron core. As far as understood from the above result of this experiment, all the examples except for the example 1 of prior art exhibit the same result and thus seem to be applicable in the same way. However, the following characteristic shows that the example 2 of prior art is also inappropriate in use.

Figure 3:
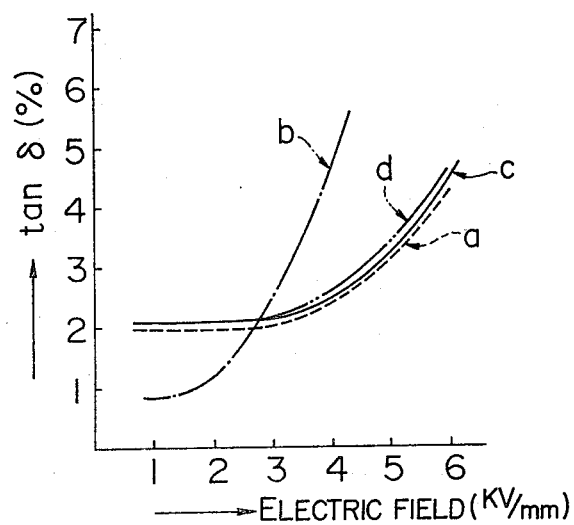
FIG. 3 is a graph illustrating the tan δ vs. voltage characteristics.

In the examples 1 and 2 of this invention, the sliding by the thermal cycling is done always in a state that the winding, the liner and the iron core are in a close contact. For this, the insulating characteristic which is a feature of the method for impregnating integrally the winding-iron core gap with the adhesion, is not damaged, as shown in FIG. 3 illustrating the tan $\delta$ vs. voltage characteristic in which the curves $a$ to $d$, respectively, indicate the characteristics of the Examples 1 and 2 of prior art and of this invention.

With respect to this point, the example 2 of prior art exhibits a remarkable rise of tan $\delta$ at a high voltage. This is because such example is provided around the winding with a fluorine-contained polymer film layer which is not adherent to the adhesive used and it is impossible to apply the corona discharge shielding treatment to the film layer. This fact implies that the corona discharge easily occurs and that the insulation life of windings tends to be shortened.

Then, the ac voltage of 6 KV/mm and at 1.5 KHz of frequency was applied for 1600 hours to the individual windings constructed as mentioned above. After the windings were deteriorated by impression of such voltage, thereon measurement was made as to the reduction rate of the breakdown voltage. The result is shown in Table 3.

Table 3

| Example | Reduction rate of breakdown voltage |
|---|---|
| Example 1 of prior art | 20 % |
| Example 2 of prior art | 65 % |
| Example 1 of this invention | 20 % |
| Example 2 of this invention | 20 % |

It will be seen from this result that the respective examples except for the example 2 of prior art exhibit very low deterioration due to voltage impression. As previously described referring to FIG. 3 illustrating the tan $\delta$ vs. voltage characteristic, in the case of the prior art example 2, the corona discharge tends to occur so easily that the reduction rate of breakdown voltage is large. It is thus evident that the insulation life of the windings is shortened in the prior art example 2.

It will be understood from the foregoing description that neither example of prior art suffices concurrently for the requirements of the insulation characteristic and the shearing of adhesion, unlike the examples 1 and 2 of this invention, so that the prior art examples are undesirable for application thereof to the practical electric machine.

Conversely, the examples 1 and 2 of this invention both have a low reduction rate of breakdown voltage and a small shearing of adhesion. That is, these examples can stand actual use in the practical electric machine.

Various experiments showed that the material which may be processed to have semiconductivity and is able to sufficiently serve as a liner, is polyamide paper now being the most perferable one. However, this invention is not limited to the polyamide paper. The following materials are usable for the liner, for example, a liner formed by coating with the mould releasing agent, or one formed as a base member, such as an insulating cloth not woven and an insulating woven cloth, or a liner formed by coating an etched base member of film duplicately with varnish for corona shielding and with mould releasing agent is desirable.

As described above, the present invention is constructed by assembling each of the windings into the iron core through the semiconductive liner of which at least one side is coated with mould releasing agent, and by filling the gaps between the winding slots and the windings with adhesive. Therefore, even it the adhesive total impregnation method is applied to the large sized electric machine, the winding insulation is not damaged by the thermal stress occuring at thermal cycling due to the repeated start and stop of the electrical machine. This invention presents a sufficient effect for the corona discharge so that it is effective particularly for an ac electrical machine of high voltage.

Moreover, the present invention enables the total impregnation method to be applicable for the iron core of relatively large thickness. As a result, the production process of the electric machine is simplified and more particularly that of a large sized electric machine may be remarkably reduced.

What is claimed is:
1. An electromagnetic apparatus comprising:

an iron core made from laminations of steel sheets and having a plurality of slots at the surface thereof for accommodating windings;

insulated windings embedded in said slots of said iron core;

semiconductive liners each being disposed between said insulated winding and the wall of the corresponding slot and of which at least one side thereof is provided with a mould releasing material; and adhesive filling said slots.

2. An electromagnetic apparatus as claimed in claim 1, in which said liner side provided with the mould releasing material is so disposed as to face the wall of said slot.

3. An apparatus as claimed in claim 1, in which said liner is formed by coating a polyamid paper with polyamidimide resin including carbon powder and by providing at least one side of said polyamide paper coated with said polyamidimide resin with mould releasing material.

4. An apparatus as claimed in claim 3, in which said liner side provided with mould releasing material is so disposed as to face the wall of said slot.

* * * * *